United States Patent
Brothers, Jr. et al.

(10) Patent No.: US 6,930,637 B2
(45) Date of Patent: Aug. 16, 2005

(54) METHOD AND APPARATUS FOR HIGH RESOLUTION TRACKING VIA MONO-PULSE BEAM-FORMING IN A COMMUNICATION SYSTEM

(75) Inventors: Louis R. Brothers, Jr., Dorchester, MA (US); John Cangeme, Billerica, MA (US); Alexander Flaig, Concord, MA (US); Samuel J. MacMullen, Carlisle, MA (US); H. Vincent Poor, Princeton, NJ (US); Tandhoni S. Rao, Ashland, MA (US); Stuart C. Schwartz, Princeton, NJ (US); Triveni N. Upadhyay, Concord, MA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/293,834

(22) Filed: Nov. 13, 2002

(65) Prior Publication Data

US 2004/0046695 A1 Mar. 11, 2004

(Under 37 CFR 1.47)

Related U.S. Application Data

(60) Provisional application No. 60/331,423, filed on Nov. 15, 2001.

(51) Int. Cl.$^7$ .............................. G01S 5/02; H01Q 3/16
(52) U.S. Cl. ..................... 342/427; 342/377; 455/561
(58) Field of Search ................................ 342/377, 383, 342/427; 455/561, 562.1

(56) References Cited

U.S. PATENT DOCUMENTS

| | | | |
|---|---|---|---|
| 5,854,612 A | * | 12/1998 | Kamiya et al. ............. 342/383 |
| 5,892,700 A | | 4/1999 | Haardt |
| 6,008,759 A | | 12/1999 | Tangemann et al. |
| 6,133,866 A | * | 10/2000 | Kanter ......................... 342/16 |
| 6,181,276 B1 | | 1/2001 | Schlekewey et al. |
| 6,212,406 B1 | | 4/2001 | Keskitalo et al. |
| 6,218,987 B1 | | 4/2001 | Derneryd et al. |
| 6,661,366 B2 | * | 12/2003 | Yu ............................. 342/17 |

FOREIGN PATENT DOCUMENTS

EP  0 096 144  * 12/1983 ........... G01S/13/44

OTHER PUBLICATIONS

Lo, K. W. "Adaptivity of a Real Symmetric Array by DOA Estimation and Null Steering," IEE Proc–Padar, Sonar, Navigation, vol. 144 No. 5, Oct. 1997, pp. 245–251.*

Morrixon, Andrew et al, "A Space–Time Beamforming RAKE Receiver for Third Generation Wideband CDMA Base Stations," ICCE International Conference on Consumer Electronics, Jun. 1999, pp. 312–313.*

(Continued)

*Primary Examiner*—Gregory C. Issing
(74) *Attorney, Agent, or Firm*—Ronald O. Neerings; Wade James Brady, III; Frederick J. Telecky, Jr.

(57) ABSTRACT

Method and apparatus for high resolution tracking via mono-pulse beam-forming in a communication system in which the capacity and range of mobile or fixed wireless communication base stations are improved by implementing a single or multiple antenna beam per signal path. Adaptive beam-forming based on up-link direction-of arrival estimation can be performed without using the above-mentioned computationally intensive techniques.

17 Claims, 6 Drawing Sheets

OTHER PUBLICATIONS

Winters, Jack H., "Smart Antennas for Wireless Systems," IEEE Personal Communications, Feb. 1998, pp. 23–27.*

Kuchar, Alexander, et al, "Real–Time Smart Antenna Processing for GSM1800 Base Station," IEEE 49th Vehicular Technology Conference, May 1999, pp. 664–669 vol. 1.*

Kederer, Werner et al, "Direction of Arrival (DOA) Determination Based on Monopulse Concepts," 2000 Asia Pacific Microwave Conference, Dec. 2000, pp. 120–123.☐☐.*

Sheng, W.X. et al, "Super–Resolution DOA Estimation in Switch Beam Smart Antenna," ISAPE 2000, 5th International Symposium on Antennas, Propagation and EM Theory, Aug. 2000, pp. 603–606.*

Kederer, Werner et al, "Direction of Arrival (DOA) Determination Based on Monopulse COcepts," 2000 Asia–Pacific Microwav Conference, Dec. 2000, pp. 120–123.*

Lo, K. W., "Adaptivity of a Real–Symmetric Array by DOA Estimation and NullSteering," IEE Proceedings Radar, Sonar, and Navigation, Oct. 1997, pp. 245–251.*

"Smart Antennas For Mobile Communication Systems: Benefits and Challenges", G.V. Tsoulos, Electronics & Communication Engineering Journal, Apr. 1999, pp. 84–94.

"Smart Antennas", Michael Chryssomailis, IEEE Antennas and Propagation Magazine, vol. 42, No. 3, Jun. 2000, pp. 129–136.

"A Comparison of Tracking–Beam Arrays and Switching––Beam Arrays Operating in a CDMA Mobile Communication Channel", IEEE Antennas and Propagation Magazine, vol. 41, No. 6, Dec. 1999, pp. 10–22.

* cited by examiner

METHOD AND APPARATUS FOR HIGH RESOLUTION TRACKING VIA MONO-PULSE BEAM-FORMING IN A COMMUNICATION SYSTEM

This application claims priority under 35 USC §119(e)(1) of provisional application number 60/331,423, filed Nov. 15, 2001.

BACKGROUND OF THE INVENTION

The invention relates to base station equipment for receiving and transmitting one or more signals from one or more users, in which the signals may arrive at the equipment along a multiplicity of paths, from possibly different directions, and with possibly different delays.

A major concern for providers of wireless communications services is system coverage and capacity. Future systems promise data rates and an aggregate capacity significantly higher than current systems. However, with conventional base stations, the maximum link closure range will be decreased substantially for users operating at higher data rates. As a result, the promised data rates and aggregate capacity can only be supported in a small region close to the base station.

Smart antenna systems have been discussed in the literature as a means of increasing capacity and coverage over and above that which can be provided with simple omni-directional antennas. They achieve this through spatio-temporal correlation of desired signals and co-channel interference within a cell. Interference suppression is implemented by forming narrow radiation patterns, forming radiation nulls on significant interference points or a combination of the two. Smart antennas are implemented in several forms; switched-beam, Direction-of-Arrival (DOA) or Optimum Combining derived adaptive-beams. Some systems are analog where the beam is formed in an RF manifold such as a Butler matrix but the most flexible are those that are digitally formed.

Switched beam systems such as the one described in U.S. Pat. No. 6,218,987 entitled "Radio Antenna System", form several fixed beams in an RF Butler matrix with the ability to simultaneously broadcast a common channel with a high gain wide beam. A similar fixed beam system is described in U.S. Pat. No. 6,181,276 entitled "Sector Shaping Transition System and Method" where a combination of a set of fixed beams can be coherently combined, by analog means, to form another beam that is better adapted to the area loading of the cell. These switched-beam systems do not take advantage of the maximum gain offered by the full aperture. As a mobile moves through a cell it will suffer beam-width modulation as it travels between the peaks of the several fixed beams. Furthermore, switched-beam approaches simply further sub-divide a cell into sub-sectors. Unfortunately, this method requires handoff between the sub-sectors just as with a standard 3-sector system. These handovers require valuable resources and ultimately reduce the capacity of the network.

In the recent papers entitled "A comparison of Tracking-Beam arrays and Switching-Beam Arrays Operating in a CDMA Mobile Communication Channer", IEEE Antennas and Propagation Magazine, Dec. 1999, and "Smart Antennas", IEEE Antennas and Propagation Magazine, Jun. 2000, "Smart Antennas for Mobile Communication systems: Benefits and Challenges", Electronics and Communication Engineering Journal, Apr. 1999, it has been shown that adaptive-beam systems perform better than switched-beam systems especially in high interference environments. They perform better partly because they take spatial and temporal correlations of interfering signals into account and eliminate the need for frequent handovers within a sector and also tend to maintain maximum antenna gain in the desired direction Adaptive-beam systems can be used to track individual mobile terminals within a base station service area. Several different methods are disclosed in the literature that all attempt to find an array weighting vector that maximizes the SINR for a desired signal. These methods vary in complexity. Estimation of signal parameters by rotational invariance techniques (ESPRIT) is more widely used than the other sub-space eigen-decomposition method Multiple Signal Classification (MUSIC). Although MUSIC is considered to achieve higher resolution it also requires more computation in its searching algorithm than the closed form solution provided by ESPRIT. These eigen-decomposition methods require a good estimate of the array covariance matrix by averaging over time, such that in the limit where the averaging time approaches infinity the estimate becomes exact. The array covariance matrix is found by averaging over several snapshots of the array signal values. Once determined the matrix can be updated after every sample. Several recent patent disclosures cite the use of ESPRIT for adaptive beam-forming such as U.S. Pat. No. 6,008,759 entitled "Method of Determining the Direction of Arrival of a radio Signal, as well as Radio Base Station and Radio Communications Systems" and U.S. Pat. No. 5,892,700 "Method for the High Resolution Evaluation of Signals for One or Two Dimensional Directional or Frequency Estimation". In the preferred embodiment of the former, a sub-optimal method is introduced that forms a beam based on the steering vector determined from the strongest eigen-value. This eliminates the need for full eigen-decomposition and significantly reduces computation time allowing faster track updates. It is considered sub-optimal because it does not attempt to place nulls on significant interference and thus does not maximizing SINR. However, it is suggested that interference may be suppressed further by standard side-lobe control methods. Furthermore, ubiquitous multi-path propagation with uncorrelated fading would require at least two paths to be resolved requiring means for several channels. In one embodiment of the latter, ESPRIT is used to resolve several multi-path signals from a single desired source simultaneously and therefore take advantage of maximal ratio combining. Although this technique is considered optimum combining because it maximizes SINR it has the disadvantage that its solution does not necessarily place the peak of an antenna beam on the desired signal path. The effect of this is the degradation in sensitivity of the system to the thermal noise thus reducing the range of the base station.

The methods described in the above-mentioned references require computationally expensive eigen-decomposition of the estimated array covariance matrix requiring at least an (M×M) matrix inversion where M is the number of antenna elements. Accordingly as the number of users, K, and the number of elements, M, grows the matrix manipulation will become unwieldy and memory intensive. Conversely, the method and apparatus of this invention replaces the (M×M) matrix inversion to a single computation of a ratio. Furthermore, the above-mentioned references describe methods that incorporate switched and fixed beam solutions that carry the burden of frequent handovers.

Other less computationally intensive methods for adaptive beam-forming and direction finding do exist. For example, a simpler means of DOA estimation disclosed in U.S. Pat. No. 6,212,406, "Method for Providing Angular Diversity, and Base Station Equipment", outlines a search and track by scan method, relying on beam-width modulation, determines directions and delays of signals by seeking the strongest power levels or largest SINR. In a multi-path environment where the signal could jump discontinuously, too much time could elapse before reacquiring the signal. Furthermore, searching for a maximum signal to determine whether maximum antenna gain has been achieved will prove difficult for near-in high speed mobile units and signals experiencing fast fading. Signal level measurement uncertainty could also be construed as beam-width modulation further degrading accuracy.

Extensively used in many Radar and Sonar discriminators, another successful technique utilized for DOA tracking is known as mono-pulse beam forming and is described in "Introduction to Radar Systems", M. I. Skolnik, 1980. Unlike ESPRIT and MUSIC techniques, mono-pulse estimation of DOA requires only the determination of a single ratio of two signals. The two signals are generated by forming two different beams from a single antenna: 1) a summation beam, 801, containing the signal information that is ultimately carried through the rest of the network and 2) a difference beam, 802. Over angle space this ratio is a well behaved function, 901 from which an accurate estimate of DOA relative to the current beam position may be determined. Its accuracy is an improvement over beam peak finding because of the sharpness of the difference beam null relative to the broad nature of the antenna beam. Its performance does rely on the ability to find the zero of the difference beam null and in a high interference or noisy environment this null tends to fill increasing the uncertainty of the angle offset estimate. Therefore, this technique requires a low interference environment. However, mobile communication lends itself to this technique due to the separation of radio links via various multi-access schemes such as CDMA TDMA, and FDMA. Thus, low interference is achieved through the orthogonality of the co-channel users.

Historically, mono-pulse tracking, although simple to implement, has not been utilized in multiple access communication systems. Digital beam-forming has only recently started to make a presence in practical systems due to the growth in processing speeds. Prior to digital implementations beam-forming systems have typically been realized in analog. To realize multiple beams in multiple access systems would require separate analog channels in the antenna beam-formers, including separate phase shifters and attenuators. The number of phase shifters and attenuators could number in the hundreds and even thousands per antenna, depending on the capacity of the system and the number of antenna elements in the phased array. This limits the number of simultaneous multiple beams to tens-of-beams and not hundreds-of-beams required for multi-access communication. Mono-pulse tracking has not been previously implemented for this application because it implies the real-time tracking of multiple simultaneous beams. Digital processors and ASIC's have just recently surpassed the performance requirements to achieve such a result. However, computational resources are still and always will be considered premium. Thus, a need exists to preserve as much of the computational resources as possible while enabling a significant increase in the capacity and range of communication systems.

SUMMARY OF THE INVENTION

In one embodiment of the invention the capacity and range of mobile or fixed wireless communication base stations are improved by implementing a single or multiple antenna beam per signal path. Adaptive beam-forming based on up-link direction-of-arrival estimation can be performed without using the above-mentioned computationally intensive techniques.

DETAILED DESCRIPTION

Figure 1:
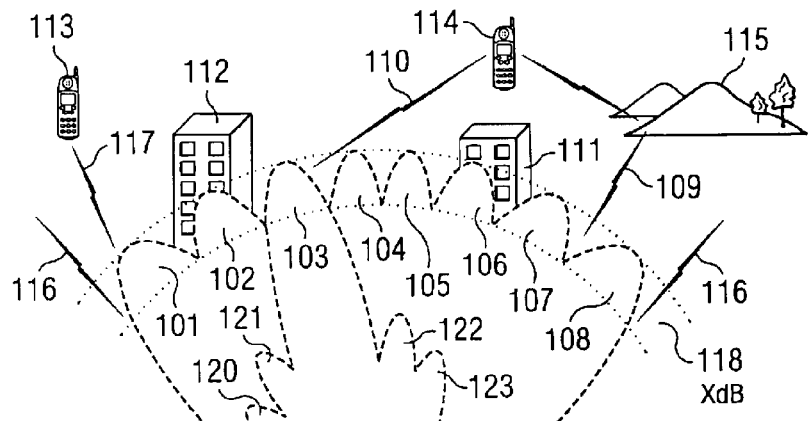
FIG. 1 illustrates the low resolution angle estimation with a set multiple fixed beams in a multi-user multi-path environment.

Adaptive beam-forming can be implemented digitally in the base-band. Therefore, some means of down-converting an RF signal to base-band as well as a scheme for calibration is assumed. The algorithm can be divided into two steps: 1) a low resolution search performed by the fixed beam searcher, 2) high resolution tracking which utilizes standard mono-pulse techniques. Alternatively, if the approximate location of the mobile or fixed wireless user is known or is determined by other means the low resolution track can be circumvented with high resolution mono-pulse tracking only. The simplicity of this direction-of-arrival estimation calculation will enable real time tracking of a mobile station within the sector area serviced by the antenna.

The low resolution search is performed by comparing the signals in each of the beams that sub-divide the sector, (eg. 101–108). The signals may be line of sight (LOS) or a time delayed non-LOS multi-path. The base station equipment will decide which and how many of the signals it will need, to meet the required signal-plus-interference-to-noise ratio (SINR) for that service. The base station will then cue multiple agile and autonomous high resolution tracking beams to within +/−½ beam-width where each of these signals reside. The agile beam is initially formed by phasing the signals of each element in the array with a set of weighting vectors corresponding to that fixed beam (101–108). With the agile beam cued to the approximate location, the mono-pulse estimator will determine the fine adjustment needed to lock on the signal. The agile beam becomes autonomous and tracks the signal wherever it is within the 120° sector until it is handed off to another sector or base station or the signal is lost. In a multi-path environment with many obstructions, a signal from a mobile station will likely become abruptly shadowed. Under such circumstances, the tracking algorithm will lose the signal and its track. However, an embodiment of this invention is the implementation of a low resolution fixed beam search that can be running continuously in the background, so that within the next timeslot or symbol another signal will be acquired if one exists within the field-of-view of the antenna.

Mono-pulse DOA is performed by measuring the relative signal levels of two different beams formed with the same antenna. The summation beam is formed by the summation of coherently phased signals from a plurality of elements within an antenna array. The difference beam is formed by symmetrically dividing the antenna and summing the signals from one half of the elements, exactly out of phase with the remaining half of the elements. The ratio of the difference beam signal relative to the summation beam signal results in a signal proportional to the magnitude of the angular offset and whose polarity indicates to which side of the beam peak, the signal is present. The tracking loop then tends to keep the maximum of the antenna gain in the desired direction by keeping the signal centered on the zero of the corresponding difference pattern.

For code-division multiple access (CDMA) systems it is assumed that the RF signal has been matched filtered and de-modulated to a digital base-band signal prior to any beam-forming. This assumption includes the low resolution fixed beam search as well as for every agile beam. Mono-pulse estimation therefore can be performed after de-scrambling and de-spreading separates the desired signals from other co-channel interference (CCI). This ensures that tracking accuracy and precision is not degraded. For time-division multiple access (TDMA) systems it is assumed that the radio-frequency (RF) signal has also been matched filtered and delayed and that synchronization is established. The beam-formed signal can then be directly applied to the mono-pulse estimation circuitry.

Downlink beam-forming can be achieved by utilizing the DOA parameters derived on the uplink. In FDD systems where the separation of transmit and receive frequency bands are relatively narrow it is known that DOA parameters are virtually invariant to frequency. To reduce the probability that a single downlink signal will undergo a deep fade, two or more signals can be transmitted through multiple downlink beams derived from uplink DOA estimation. The likelihood that the mobile will encounter a deep fade in two different multi-paths is low. Therefore, it would be prudent to transmit at least two signals in two downlink beams as disclosed in U.S. patent application Ser. No. 09/987,722, filed Nov. 15, 2001, and entitled "Method and Apparatus for Received Uplink-Signal Based Adaptive Downlink Diversity Within a Communication System". The uplink DOA information provided by this search and track method can be directly applied to the downlink with the appropriate frequency transformation of the array weighting vectors.

Angle estimation in one plane with an M-element linear array has been considered above. This approach can be extended to 2-D DOA estimation in both the azimuth and elevation planes utilizing a 2-dimensional (M×L)-element planar array symmetrically divided into left-right and top-bottom halves. The signal from each element is used to construct, not two beams as with the linear array discussed above but a cluster of three beams that are slaved to each other. The summation beam is formed by taking the sum of all of the signals from each of the elements after they have been phased properly to correspond with an appropriate steer angle which lies within a specified maximum conical angle relative to the normal of the plane of the array. The azimuth difference beam is formed by summing the signals from every element after the same phase gradient for summation beam has been applied to all of the elements with an additional 180° phase shift applied to the elements comprising the left half of the array relative to the elements comprising the right half of the array. The elevation difference beam is formed by summing the signals from every element after the same phase gradient for summation beam has been applied to all of the elements with an additional 180° phase shift applied to the elements comprising the top half of the array relative to the elements comprising the bottom half of the array. This technique, when coupled with some means of time-of-arrival estimation enables location based services.

The theoretical gains achieved by any smart antenna assume a uniform distribution of users across a sector. If the density is non-uniform, the higher density sub-sectors will suffer a degradation in capacity improvement. However, multi-user detection (MUD) schemes can also be integrated with the digital beamformer to recover some of that loss. For example, if there are a cluster of users within a small angular space it might be prudent to use one or more of the fixed beams and some form of interference cancellation normally associated with (MUD) to improve the SINR.

It has been accepted that smart antennas offer an additional degree of freedom for operators to improve the capacity and range of their systems. The methods of this invention are much less complex, and thus less costly than many of the other computationally intensive eigen-decomposition techniques such as ESPRIT and MUSIC. It will also perform far better than existing sectorization methods by achieving a high gain antenna beam on every user while simultaneously eliminating the need for frequent handovers. Furthermore, the mono-pulse technique has been a proven method over several decades in single beam Radar systems. Digital processing technologies have now enabled such a technique to be used in the multi-access, multi-user, fixed and mobile wireless communication systems.

The adaptive beam-forming method comprises two functions: 1) low resolution angle estimation performed by the fixed beam searcher and 2) high resolution angle estimation performed by the agile beam tracker.

FIG. 1 illustrates a multi-user multi-path path environment illuminated by a set of fixed beams that sub-divide the sector. Fixed beam searching is used for low resolution tracking and the initial acquisition of a user. The fixed beam search (FBS) processor segments the entire (120°) sector 116 into M beams (eg. 101–108), with cross-over points at a predetermined level X dB 118, usually 3 dB corresponding to the 3 dB beam-width of the antenna.

Signals arriving at the base station antenna may arrive as line-of-sight (LOS) or multi-path. Any one of the beams will contain the signals from users within the main lobe of the beam as well as attenuated versions of signals from users, outside of the main beam. The attenuation levels are a function of the sidelobe levels of the antenna pattern, 120,121,122,123. As shown in FIG. 1, there are two users 113,114 that are within the field-of-view (FOV) of the base station antenna 119. The signal 117 arriving at the base station from 113 is a LOS signal incident from the direction that beam 101 covers. The FBS will therefore assign that signal to sector 101. The is no direct LOS path from 114 to the base station antenna, however, two multi-path signals 109, 110 are present and incident from directions covered by beams 108, 103, respectively. The FBS will therefore assign the two signals to sectors 108 and 103.

Figure 5:
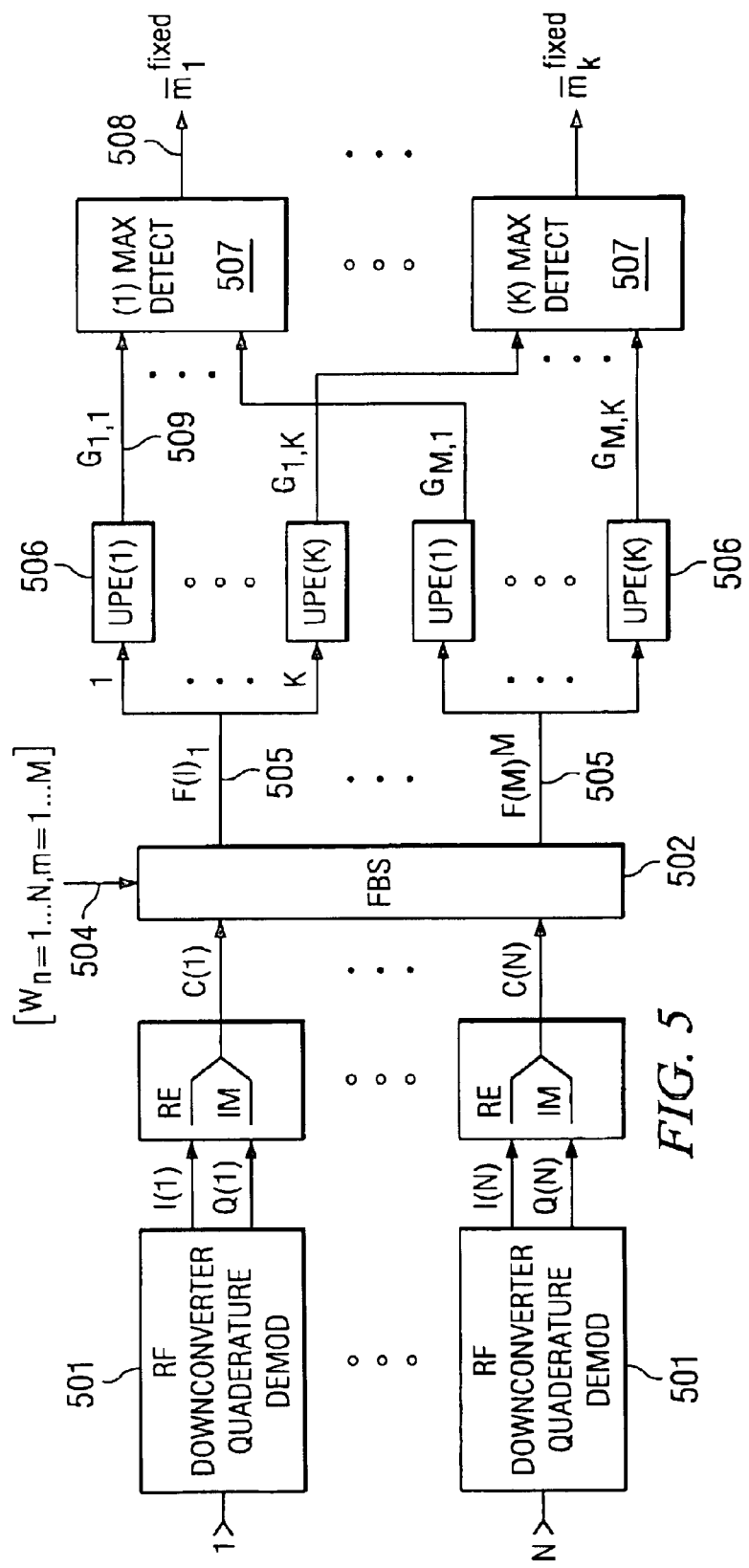
FIG. 5 depicts a block diagram of the fixed beam search processor according to an embodiment of the invention.

Turning to FIG. 5, the M beams 101–108 are formed in the Fixed Beam Searcher (FBS) 502 by performing a spatial transform of N complex samples taken from each of the N elements at M (in this example M=8) discrete points in angle space. Therefore, $$F(m) = \sum_{n=1}^{N} C(n) \cdot W_{n,m} \qquad 1$$

where,

F(m) is complex and contains the total signal in beam m,
C(n) is the complex spatial sample from element n,
$W_{n,m}$ is the complex weight applied to element n for beam m,
n is the number of the element in the array from 1 . . . N,
m is the number of the beam from 1 . . . M.

The complex signal F(m) 505 from the $m^{th}$ beam is then de-scrambled, de-spread or de-interleaved in the User Processing Element (UPE) 506 for every user or multi-path signal k=1 . . . K. The UPE functions as the correlation receiver and separates users from one another by de-spreading CDMA signals or de-interleaving TDMA signals. The UPE does not necessarily have to decode the polarity of the bit and therefore no channel phase estimation is required. It is sufficient only to determine the magnitude of the bit. A detector 507 for each user then determines the beam(s) with the maximum signal level and integration may be performed to increase the signal-to-noise prior to making the decision.

In the example, the FBS locates the signal from user 113 and assigns an agile beam to it by passing the associated (N×1) complex weight vector, $\overline{m}_{117}^{fixed}$, 508 corresponding directly with beam 101 to the agile beam search processor. Also in the example, the FBS locates the signal direction of both multi-path signals from user 114 and assigns two agile beams to them by passing the associated set of compex weights, $\overline{m}_{109}^{fixed}$ and $\overline{m}_{110}^{fixed}$ corresponding directly with beams 108 and 103, respectively, to the agile beam search processor.

Figure 6:
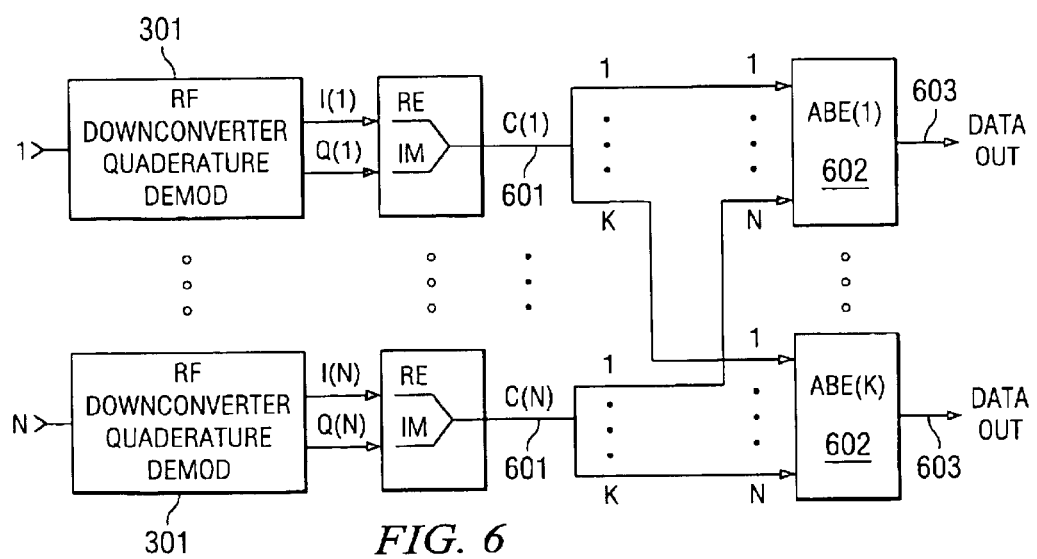
FIG. 6 depicts a block diagram of the agile beam search processor according to an embodiment of the invention.

The agile beam search processor contains at least K, agile beam elements, (ABE), 602 (shown in FIG. 6). Initially, in each ABE, a comparison is made between the current weights $W^i_{n,k}$ and the weights associated with the beam where the signal is located, 712. If the direction associated with the weight $W^i_{n,k}$ is within one beam-width of that found by the FBS than the agile beam is tracking the signal and the beam becomes autonomous, otherwise $W^i_{n,k}$ is reset to $\overline{m}_k^{fixed}$.

Figure 2:
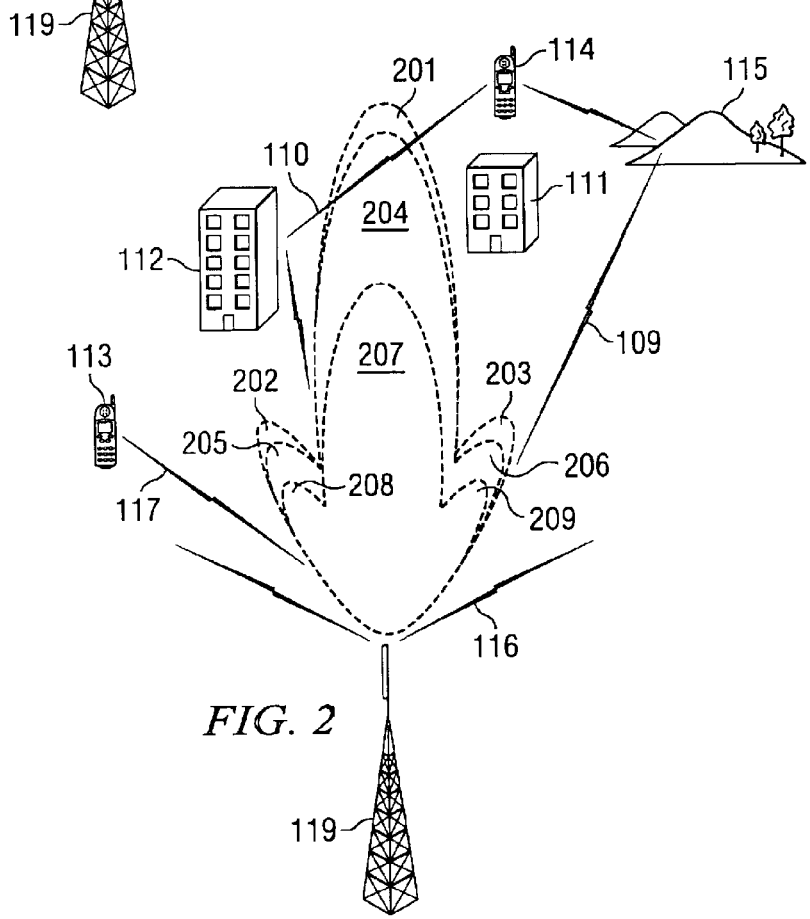
FIG. 2 depicts a snapshot of a set of agile beams prior to track.
Figure 3:
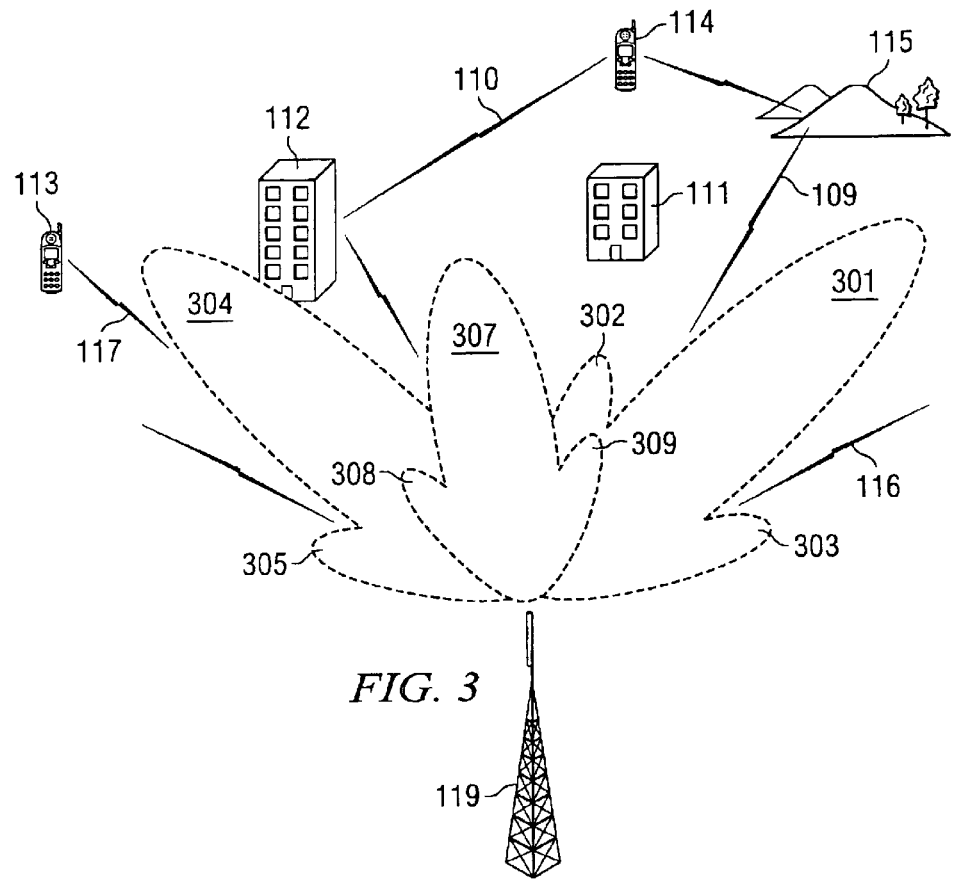
FIG. 3 depicts a snapshot of a set of agile beams positioned at locations determined by the fixed beam search processor.
Figure 4:
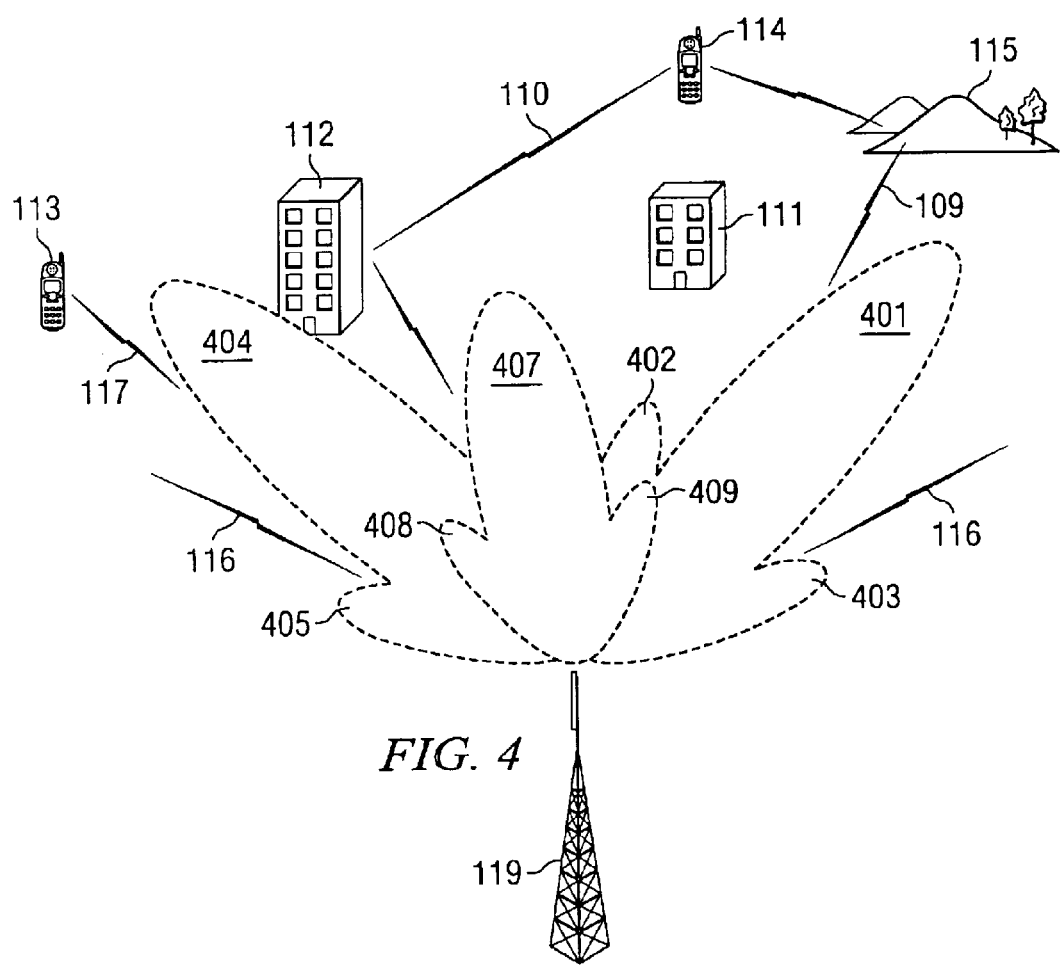
FIG. 4 depicts a snapshot of a set of agile beams locked onto their respective signal paths.

FIGS. 2–4 represent snapshots of beam positions as the agile beam processor tracks and locks onto the several signals from the several users. In the example, three agile beam elements, 602, are assigned to two users. One user, 113 is assigned one ABE and the other user 114 is assigned two ABE's. Prior to any information about the DOA of each signal, the beam positions are arbitrary 201, 204, 207. Within the next symbol, slot, timeslot, or frame the beam positions are cued to the established sectors 301, 304, 307 previously determined by the FBS. With the agile beams cued to the correct sectors they become active and begin high resolution track utilizing mono-pulse estimation.

Figure 8:
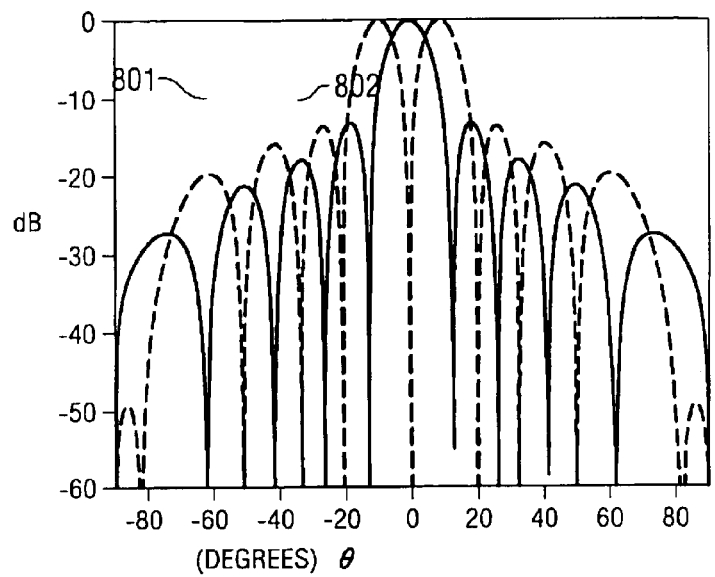
FIG. 8 illustrates the relation of a $\Sigma$-beam pattern with a $\Delta$-beam pattern.

FIG. 8 illustrates that a mono-pulse tracking system is implemented by forming two beam patterns shown: the sum pattern 801 (shown solid with a peak at 0°) and the difference pattern 802 (shown dashed with a null at 0°). Both of these patterns are formed using the single antenna or aperture. The sum pattern is used to provide absolute power information of the received signal and is simply formed by summing the signals from several elements of an array. The difference beam is formed by partitioning the array into two halves phasing one half of the aperture to 180° with respect to the other and then summing the two signals from both halves. The ratio of the complex voltages provided by the sum and difference beams provides the discrimination information for DOA estimation and beam tracking.

Figure 9A:
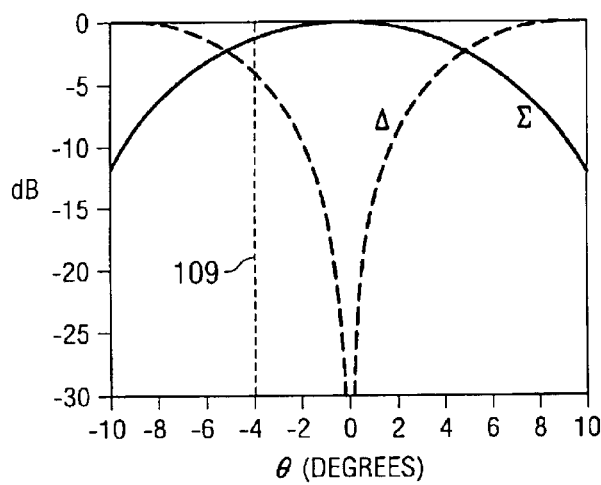
FIG. 9 illustrates the mono-pulse angle estimation curve according to an embodiment of the invention.
Figure 9B:
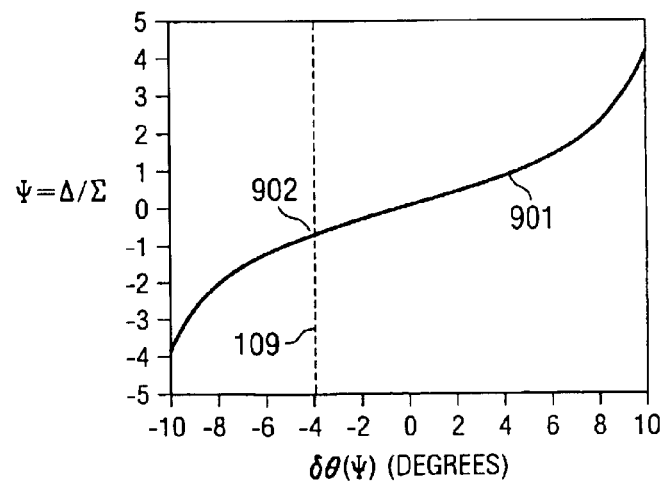

Referring to FIG. 9, it is seen that computing the real part of the complex ratio of the difference pattern with respect to the sum pattern over angle space, $$\Psi(\theta) = \text{RE}\left[\frac{\Delta(\theta)}{\Sigma(\theta)}\right] \qquad 2$$

results in the mono-pulse angle estimation curve of 901. This curve, representing the ratio of complex voltages at the sum and difference beam signal ports, is proportional to the DOA of the incident energy relative to the current beam position. For example if the user is located at 0°, $\Delta(\theta)=0$ and thus $\Psi(\theta)=0$, depicting that tracking can be implemented with a feedback loop that attempts to keep the beam centered at the zero of the difference pattern.

Figure 7:
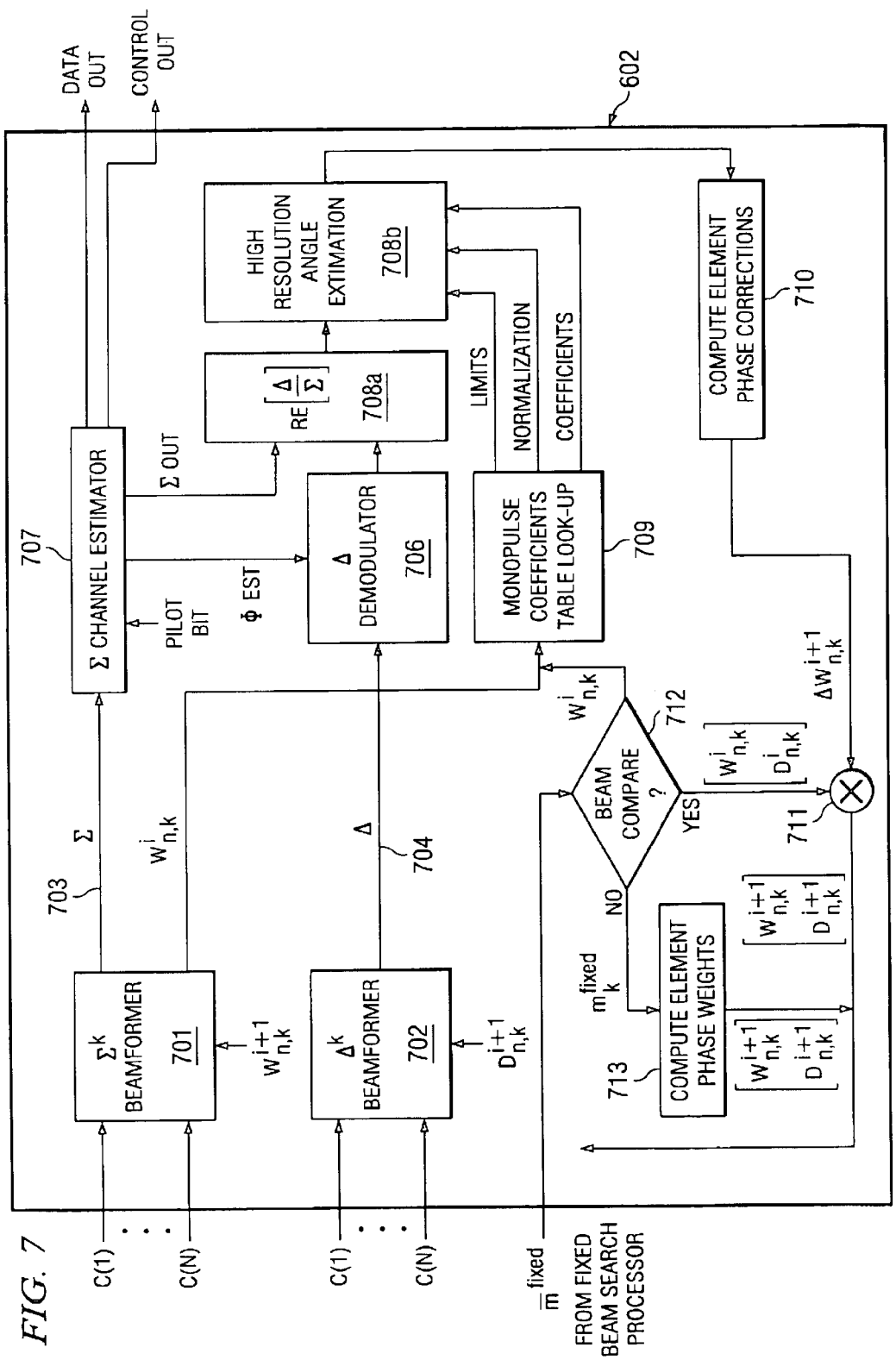
FIG. 7 depicts a block diagram of an agile beam element according to an embodiment of the invention.

FIG. 7 depicts a block diagram of the mono-pulse beam-former and the tracking loop. Each ABE processes signals from a plurality of antenna elements, N. The sum beam is formed in the Σ beam-former 701 by performing the spatial transform as follows $$\sum(k) = \sum_{n=1}^{N} C(n) \cdot W_{n,k} \qquad 3$$

where, $\Sigma(k)$ is complex and contains the total signal in beam k,
C(n) is the complex spatial sample from element n,
$W_{n,k}$ is the complex weight applied to element n for beam k,
n is the number of the element in the array from 1 . . . N,
k is the number of the user or the user's signal.

The difference beam is formed in the Δ beam-former 702 by performing the spatial transform as follows $$\Delta(k) = \sum_{n=1}^{N} C(n) \cdot D_{n,k} \qquad 4$$

where, $\Delta(k)$ is complex and contains the total signal in beam k,
C(n) is the complex spatial sample from element n,
$D_{n,k}$ is the complex weight applied to element n for beam k,
n is the number of the element in the array from 1 . . . N,
k is the number of the user or the user's signal.

The Σ beam signal for a specified user, 703, is de-scrambled, de-spread or de-interleaved in the Σ Channel Estimator 707. Utilizing a pilot bit, the Σ channel estimator may also be used to estimate signal phase, φ from the control channel for W-CDMA systems. It can also deliver an integrated Σ signal with higher SNR to the mono-pulse estimator. In W-CDMA systems the handset modulator adjusts the gain of the control channel relative to the traffic channel depending on the data rate. Higher data rates require more signal energy to be stripped from the control channel in order to maintain a specified bit-error-rate (BER). To accurately estimate the channel phase, this integration may be performed to raise the signal-to-noise ratio of the control channel. The Δ-demodulator, 706 performs the same de-spreading, de-scrambling or de-interleaving and integration as the Σ-channel estimator. However, if a phase estimate is needed it will be provided by the Σ-channel estimator.

The angle estimation is performed by first taking the ratio of signals from the sum and difference channels, as in Eq 1,

708a. Then, by converting the dependent variable ψ into an independent variable and by converting the independent variable θ into a dependent variable u=sin(θ), an expression can be formed for the angle error relative to the difference beam null, $$\delta u(\Psi) = f(\Psi) \qquad 5$$

The function δu(Ψ) is odd and can be approximated by a Taylor polynomial, $$\delta u(\Psi) = a_0 + a_1 \cdot (\Psi) + a_3 \cdot (\Psi)^3 \qquad 6$$

where, δu, is the angle prediction in sine space, $$\Psi = \operatorname{RE}\left[\frac{\Delta}{\Sigma}\right].$$

Antenna patterns are a function of several variables including aperture weighting, mutual coupling, array design, and beam position. Thus, the mono-pulse estimation coefficients including, $a_i$ will also be dependent on the same parameters. These parameters are gathered by simulation and by measurement. Once gathered they are stored in a look-up table 709 and retrieved. A beam position correction can then be calculated, by using Eq 6, and mapping it to a phase correction $$\Delta W_{n,k}^{i+1} \qquad 7$$

for all of the elements, 710. This phase correction is then applied to the current agile beam position, by recalculating the phase weights $$W_{n,k}^{i+1} = W_{n,k}^{i} \cdot \Delta W_{n,k}^{i+1} \qquad 8$$

$$D_{n,k}^{i+1} = D_{n,k}^{i} \cdot \Delta W_{n,k}^{i+1} \qquad 9$$

711, once it has been verified, 712, that the signal is still in the same sector.

In the example the multi-path signal, 109 of FIG. 3 and FIG. 9 is shown to be left of beam center. The ratio, Ψ is then calculated using Eq. 2, 708a the angle error is estimated using Eq. 6, 708b, which is mapped to a phase correction, 710 and then applied to the current beam position using Eq. 8 and 9, 711. The result is a new beam, 401 that is now centered on the signal.

Conclusion

A first method positions the highest antenna gain on the multiple signal paths of a communication link between two or more communication devices within a sector. The signal within the sector is acquired and its location within the portion of the sector is determined by utilizing a low resolution search comprising of a set of fixed antenna beams that divide the associated sector into its portions. By evaluating the optimal signal of those provided by each fixed beam, the location is ascertained by mapping the beam position to a portion of the sector. This mapping also produces a set of antenna array weighting vectors for each and every communication link within the sector of the communication system associated with the antenna.

A secondary set of antenna beams is provided for each and every desired signal path from the multiple users. The initial set of antenna array weighting vectors are determined by the low resolution search. This set of agile beams can be scanned continuously within the sector while tracking the signals from the users within the sector. Once initial acquisition is achieved agile beam tracking is performed by mapping an angle offset determined from the ratio of two signals. These signals are provided by two slaved beams, the summation beam and the difference beam, that comprise a single agile beam. The relationship of Equation 2 determines an amplitude that can be mapped as an angle offset relative to the null of the difference beam using Equation 6. The polarity of the result of Equation 2 determines which side of the null the signal resides. Based on this offset a new antenna weighting vector is calculated by equation 7, 8,and 9 and applied to antenna elements. This continues at a rate consistent with a timeslot (TDMA) or symbol (CDMA) until the user is handed of to another cell or sector within the cell.

A second method positions the highest antenna gain on the signal path of a communication link between two or more communication devices within a sector. A primary set of antenna beams is provided for each and every desired signal path from the multiple users. The initial set of antenna array weighting vectors are predetermined from a known user signal path location such as with fixed wireless systems or from feedback information provided by a mobile user about its approximate location within the sector or cell. A set of agile beams can be allocated to each user and scanned continuously within the sector while tracking the signals from the users within the sector. Once initial acquisition is achieved agile beam tracking is performed by mapping an angle offset determined from the ratio of two signals. These signals are provided by two slaved beams, the summation beam and the difference beam, that comprise a single agile beam. The relationship of Equation 2 determines an amplitude that can be mapped as an angle offset relative to the null of the difference beam using Equation 6. The polarity of the result of Equation 2 determines which side of the null the signal resides. Based on this offset a new antenna weighting vector is calculated by equation 7, 8,and 9 and applied to antenna elements. This continues at a rate consistent with a timeslot (TDMA) or symbol (CDMA) until the user is handed of to another cell or sector within the cell.

What is claimed:

1. A method of tracking a selected radio-frequency signal in a multiple access communication system, comprising the steps of:
   determining an estimated direction of arrival of a signal received at an antenna location;
   demodulating a received signal, from the estimated direction of arrival, into a digital base-band signal;
   descrambling the digital base-band signal;
   separating a selected signal from co-channel interference in the descrambled signal;
   tracking the direction of arrival of the selected signal by performing a sequence of steps comprising:
      measuring a summation beam at the estimated direction of arrival;
      measuring a difference beam at the estimated direction of arrival;
      comparing the summation and difference beams to derive an angular offset;
      updating the direction of arrival by applying the angular offset to the estimated direction of arrival; and
      repeating the measuring, comparing, and updating steps.

2. The method of claim 1, wherein the step of determining an estimated direction of arrival comprises determining the orientation of a fixed location from which the signal is transmitted relative to the antenna location.

3. The method of claim 1, wherein the step of determining an estimated direction of arrival comprises:
   performing fixed-beam searching over a sector extending from the antenna location.

4. The method of claim 3, wherein the step of performing fixed-beam searching is performed substantially continuously as a background process.

5. The method of claim 4, wherein the step of performing fixed-beam searching comprises:

receiving signals at a plurality of antennae at the antenna location;

performing a spatial transform of the received signals at the plurality of antennae to derive a weight vector.

6. The method of claim 5, wherein the step of measuring the summation beam at the estimated direction of arrival comprises summing signals from at least some of the plurality of antennae using the weight vector;

wherein the step of measuring the difference beam at the estimated direction of arrival comprises summing signals from at least some of the plurality of antennae in a first half of an antenna array with opposite-phase signals from at least some of the plurality of antennae in a second half of the antenna array, using the weight vector.

7. The method of claim 6, wherein the first and second halves of the antenna are first and second azimuth halves.

8. The method of claim 7, further comprising:

summing signals from at least some of the plurality of antennae in a top half of the antennal array with opposite-phase signals from at least some of the plurality of antennae in a bottom half of the antenna array, using the weight vector.

9. The method of claim 1, wherein the signal comprises a code-division-multiple-access (CDMA) encoded signal;

and wherein the separating step comprises despreading the CDMA encoded signal.

10. The method of claim 9, further comprising:

prior to the tracking step, applying a match filter to the received signal.

11. The method of claim 1, wherein the signal comprises a time-division-multiple-access (TDMA) encoded signal;

and wherein the separating step comprises deinterleaving the TDMA encoded signal.

12. The method of claim 11, further comprising:

prior to the tracking step, applying a match filter to the received signal; and also prior to the tracking step, applying a delay to the received signal for synchronization.

13. A base station system for multiple access communication, comprising:

an antenna array;

a plurality of radio frequency demodulators for demodulating signals received at the antenna array into spatial samples;

a user processing element for separating signals for a selected user from received signals from other users; and a mono-pulse beam forming processor, comprising:

a summing beam former, for generating a summation signal from the plurality of spatial samples for the selected user and a weighting vector;

a difference beam former, for generating a difference signal from the plurality of spatial samples and a weighting vector;

a channel estimator, for generating an output signal corresponding to the summation signal; and circuitry for generating an angle estimation from the summation and difference signals and adjusting weighting vectors responsive to the angle estimation.

14. The system of claim 13, further comprising:

a spatial transform processor, for transforming the plurality of spatial samples into a plurality of beam signals for a plurality of users;

a plurality of user processing elements for determining a plurality of magnitudes of spatial samples corresponding to each of the plurality of beam signals; and a plurality of detectors for detecting the beam signal having the highest magnitude, the weighting vectors corresponding to ordered magnitudes of the beam signals.

15. The system of claim 13, wherein the antenna array is a linear array of antennae.

16. The system of claim 13, wherein the antenna array is a two-dimensional array of antennae.

17. The system of claim 13, wherein the plurality of radio frequency demodulators demodulate code-division-multiple-access (CDMA) signals received at the antenna array;

and wherein the user processing element separates signals by despreading the received CDMA signals.

* * * * *